(12) United States Patent
Doerr et al.

(10) Patent No.: US 7,333,688 B2
(45) Date of Patent: Feb. 19, 2008

(54) METHOD AND APPARATUS FOR FREE-SPACE OPTICAL SWITCHING

(75) Inventors: Christopher Richard Doerr, Middletown, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/930,382

(22) Filed: Aug. 31, 2004

(65) Prior Publication Data
US 2005/0185878 A1    Aug. 25, 2005

Related U.S. Application Data

(60) Provisional application No. 60/546,505, filed on Feb. 20, 2004.

(51) Int. Cl.
*G02B 6/32* (2006.01)
*G02B 6/34* (2006.01)

(52) U.S. Cl. ............................ 385/27; 385/18; 385/33; 385/37

(58) Field of Classification Search .................. 385/18, 385/27, 33, 37
See application file for complete search history.

(56) References Cited

U.S. PATENT DOCUMENTS 6,657,770 B2    12/2003    Marom et al. .............. 359/290

6,757,458 B2    6/2004    Neilson et al. ............... 385/18
2004/0151432 A1*    8/2004    Tabuchi et al. ............... 385/37
2004/0165817 A1*    8/2004    Nakagawa et al. ........... 385/24
2004/0252938 A1*    12/2004    Ducellier et al. ............. 385/27

OTHER PUBLICATIONS

T. Ducellier et al., "Novel High Performance Hybrid Waveguide-MEMS 1×9 Wavelength Selective Switch In A 32-Cascade Loop Experiment", *ECOC 2004 Proceedings*—Post-Deadline, Paper Th4.2.2.
R. Ryf et al., "Scalable Wavelength Selective Crossconnect Switch Based On MEMS And Planar Waveguides", 27th European Conference on Optical Communications, 2001, vol. 6, Sep. 30-Oct. 4, 2001, pp. 76-77.

* cited by examiner

*Primary Examiner*—Michelle Connelly-Cushwa
*Assistant Examiner*—Jerry T Rahll

(57) ABSTRACT

An apparatus and method are provided for manipulating light beams propagated through PLCs in free space. Light beams propagated in through an input/output waveguide of a PLC are propagated through a waveguide array to generate a phased array output at an edge facet of the PLC. The phased array output at the edge facet is spatially Fourier transformed by a lens in free space, generating a spectrally resolved image at the back focal plane of the lens. The spectrally resolved image is reflected, at least in part, by a reflector device and coupled into a desired waveguide array of a PLC to produce a desired output.

17 Claims, 6 Drawing Sheets

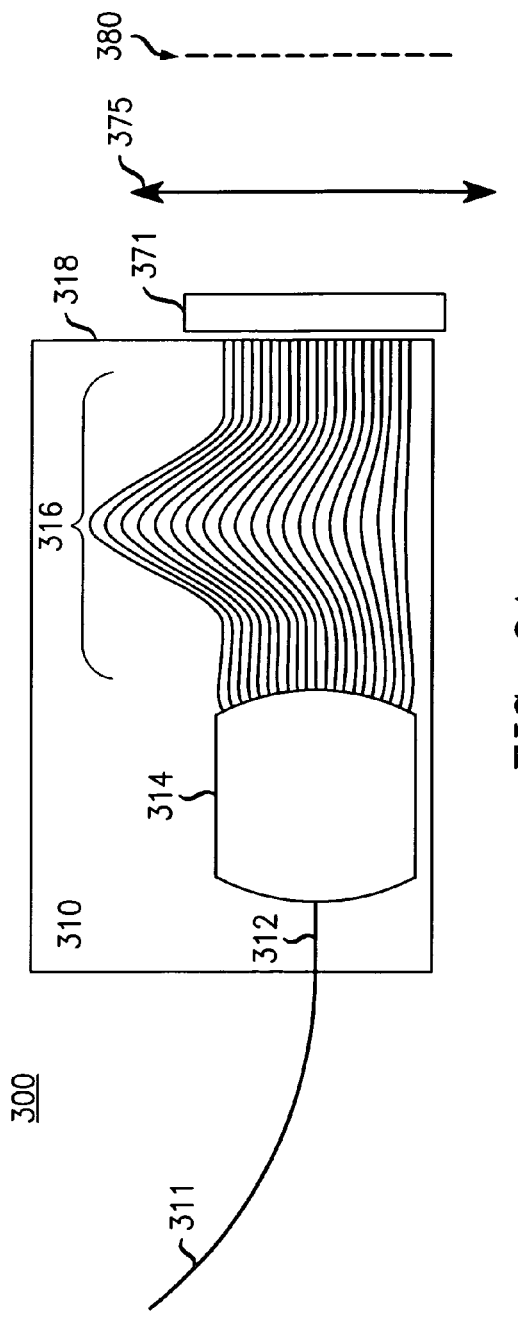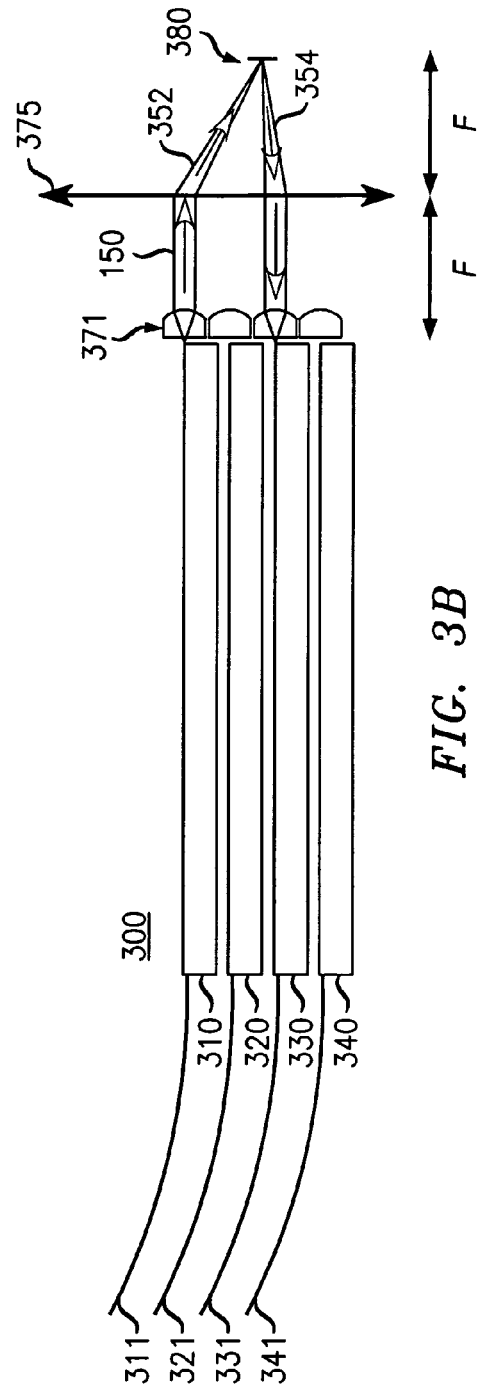
FIG. 3A
FIG. 3B

METHOD AND APPARATUS FOR FREE-SPACE OPTICAL SWITCHING

CROSS-REFERENCE TO RELATED APPLICATIONS

This application claims priority of Provisional Application Ser. No. 60/546,505, filed on Feb. 20, 2004, which is incorporated herein by reference.

BACKGROUND OF THE INVENTION

1. Technical Field

The present invention relates generally to optical switching, and more particularly to methods and apparatus for free-space optical switching using planar lightwave circuits (PLCs).

2. Description of the Related Art

PLCs have proven to be a convenient platform for fabricating components of lightwave communication systems. PLCs offer the advantages of precise manufacturing, a small form factor, and simple packaging and thermal stabilization.

Arrayed waveguide gratings (AWGs) have become the ubiquitous multiplexer/demultiplexer technology for optical wavelength division multiplexing. PLCs that include AWGs illustrate the numerous advantages of PLC technology. The functionality of an AWG on a PLC, however, is currently limited to solutions that can be implemented only in a planar structure.

Components for lightwave communication systems based on free-space optics enable the use of micro electromechanical systems (MEMS) that are compatible with free-space beam propagation. Optical switching modules based on MEMS technology provide a scalable technology that can interconnect thousands of ports, due to the full use of the three-dimensional volume associated with free-space optics. Free-space based optical components, however, have to address the packaging, alignment, stability, and thermal drift issues of bulk optics. These issues become more severe as the number of components increases.

Accordingly, it would be beneficial to design an optical component which is not limited to planar structures and which takes advantage of PLC technology and the scalability of free-space optics while addressing the issues of packaging, alignment, stability and thermal drift.

BRIEF SUMMARY OF THE INVENTION

In one embodiment of the present invention a free-space optical switching solution is provided for switching light beams between PLCs of a stacked array of PLCs using tilting micro mirrors. Each PLC of the PLC array has a waveguide array that terminates at an edge facet of the PLC for generating a phased array output. A lens is positioned adjacent to the PLC array such that the edge facets of the PLCs are at the front focal plane of the lens. The lens spatially Fourier transforms the phased array output to generate a spectrally resolved image at the back focal plane of the lens. A tilting micromirror array is placed at the back focal plane of the lens to selectively reflect the spectral components of the spectrally resolved optical image. The reflected spectral components are propagated through a lens and coupled into a desired waveguide array of on one of the PLCs to produce a desired output. The optical switching solution can also provide wavelength blocker/equalizer functionality by controlling the reflection of the selected spectral components of the spectrally resolved image to control the power of such spectral components which is coupled into a desired waveguide array.

In one embodiment of a method according to the invention optical switching is achieved by receiving a light beam, such as a WDM signal, into a waveguide of a PLC. The light beam is then coupled into a waveguide array which terminates at an edge facet of the PLC to generate a phased array output at the edge facet of the PLC. The phased array output is spatially Fourier transformed using one or more lenses to generate a spectrally resolved image. At least one spectral component of the spectrally resolved image is reflected through one or more lenses using a reflector device, to couple the reflected spectral components into a desired waveguide array on a PLC to generate a desired output (e.g. having selected wavelengths and/or a desired power level).

In another embodiment of the invention an apparatus is provided for dynamic spectral equalization comprising a PLC, a lens adjacent to the PLC, and a reflector device adjacent to the at least one lens. The PLC includes an input/output waveguide and a waveguide array coupled to the input/output waveguide. The waveguide array has waveguides terminating at an edge facet of the PLC. The edge facet of the PLC and the reflector device are respectively positioned at a front and back focal plane of the lens such that a light beam propagated in through the input/output waveguide generates a phased array output at the edge facet of the PLC. The phased array output is spatially Fourier transformed by the lens to generate a spectrally resolved image at the back focal plane. The reflector device controls the reflection of selected spectral components of the spectrally resolved image back through the lens and into the waveguide array to generate a desired equalized output on the input/output waveguide.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings:

FIGS. 3A-B are top and side views of an optical switch according to another embodiment of the invention;

DETAILED DESCRIPTION OF THE INVENTION

Figure 1A:
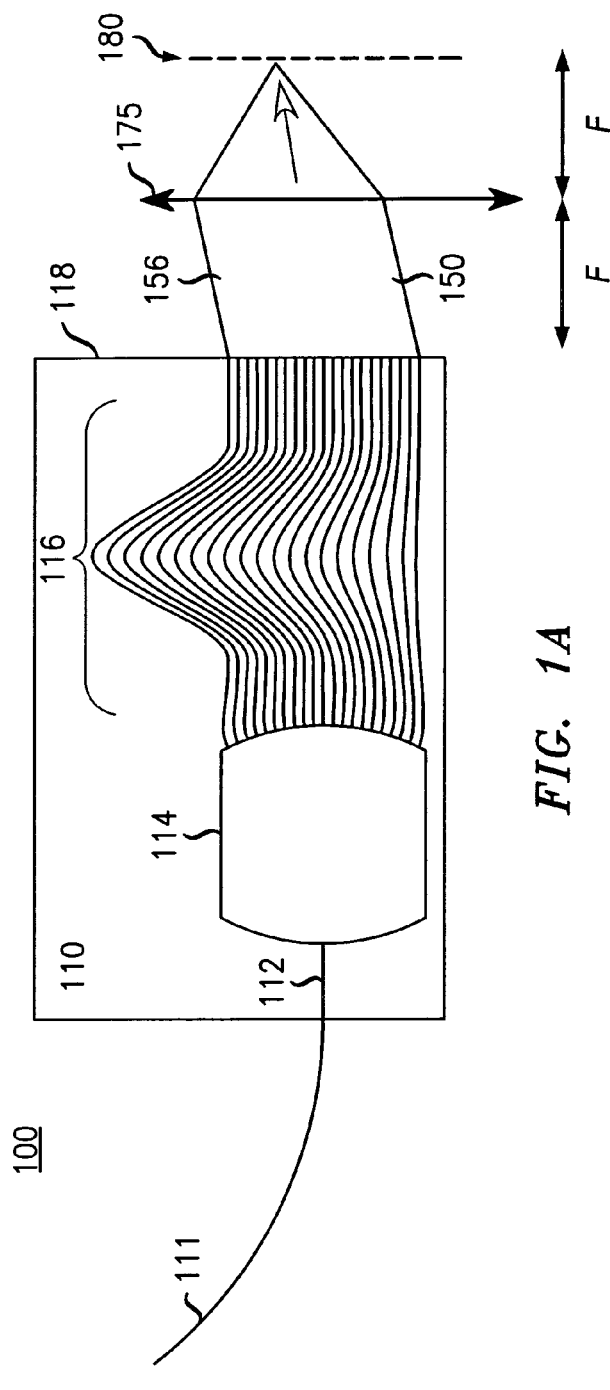
FIGS. 1A-B are top and side views of an optical switch according to one embodiment of the invention.
Figure 1B:
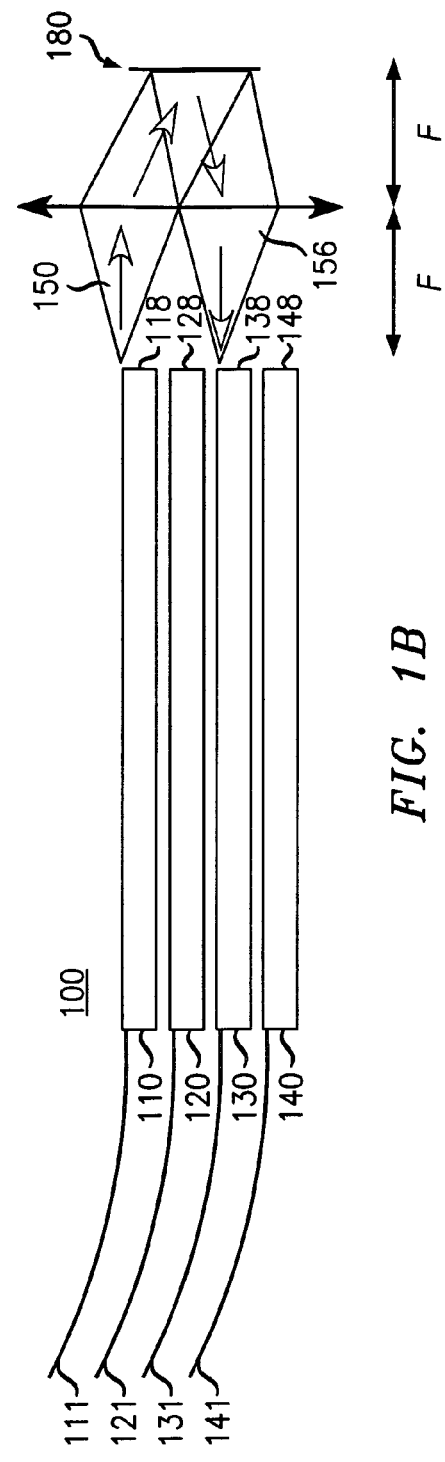

In one embodiment of the invention, shown in FIGS. 1A-B, a free-space optical switching apparatus 100 is provided for wavelength selective switching between PLCs 110, 120, 130, 140. As can be understood from FIGS. 1A-B, the switching apparatus 100 comprises a plurality of PLCs 110, 120, 130, 140 arranged in a stack.

Each PLC 110, 120, 130, 140 includes an input/output waveguide (e.g. 112). The input/output waveguides are each preferably coupled to a fiber 111, 121, 131, 141 or to other waveguides to carry light beams, such as optical wavelength-division multiplexed (WDM) signals, to and from the input/output waveguides.

A waveguide array (e.g. 116) on each PLC is respectively coupled to each input/output waveguide using, for example, a star coupler (e.g. 114). The waveguides of the waveguide arrays are preferably arranged to implement arrayed waveguide gratings, and terminate at a respective edge facet 118, 128, 138, 148 of the PLCs 110, 120, 130, 140. The edge facets 118, 128, 138, 148 are preferably anti-reflection coated to reduce loss and prevent back reflection.

It will be appreciated by those skilled in the art that, alternatively, any number of PLCs can be arranged in a variety of configurations in accordance with the present invention for switching light beams between the PLCs.

Figure 1C:
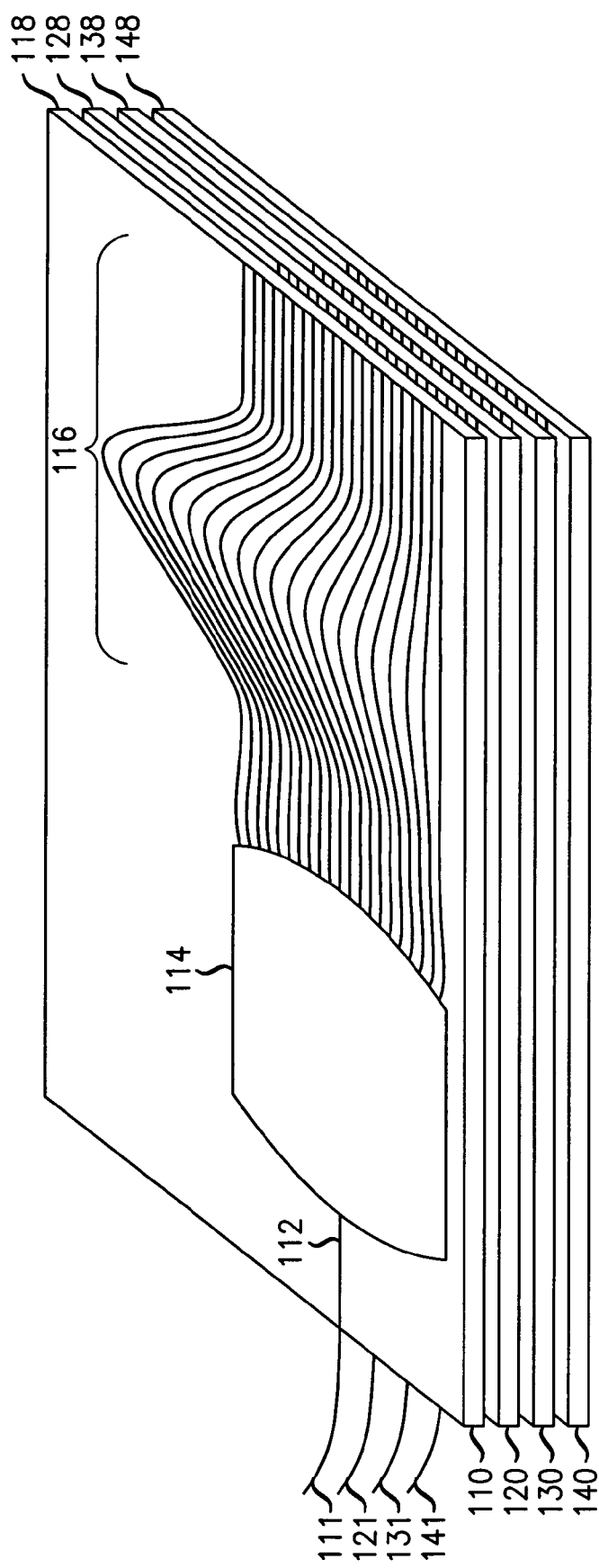
FIG. 1C is an illustration showing a perspective view of stacked planar lightwave circuits in accordance with embodiments of the invention.

As shown in the perspective view of the stacked PLCs 110, 120, 130, 140 of FIG. 1C, when the PLCs 110, 120, 130, 140 are arranged in a stacked configuration, the waveguides of the waveguide arrays (e.g. 116) on the PLCs 110, 120, 130, 140 are preferably aligned to facilitate vertical switching between waveguide arrays of the PLCs 110, 120, 130, 140.

It is to be understood that terms such as "horizontal" and "vertical" are used herein in discussing the preferred embodiments for reference purposes only and are not intended to limit the scope of the claimed invention.

A lens 175 is positioned adjacent to the PLCs 110, 120, 130, 140, and a reflector device 180, such as a tilting micromirror array, is positioned adjacent the lens 175. The lens 175 is preferably placed such that the edge facets 118, 128, 138, 148 of the PLCs 110, 120, 130, 140 are at a front focal plane of the lens 175 (i.e. at a focal distance F), such that a spectrally resolved image is generated at a back focal plane of the lens (i.e. at a focal distance F).

Those skilled in the art will appreciate that a light beam or an optical signal propagated in through one of the input/output waveguides (e.g. through an input fiber 111 and input/output waveguide 112) of one of the PLCs 110, 120, 130, 140 generates a phased array output (e.g. illustrated as light beams 150 in FIG. 1B) at the edge facet (e.g. 118) of the PLC. The phased array output is then spatially Fourier transformed by the lens 175, generating a spectrally resolved image on the reflector device 180. The spectrally resolved image is reflected, at least in part, by the reflector device 180 through the lens 175 and coupled into (e.g. as a phased array 156) a desired waveguide array of on one of the PLCs (e.g. PLC 130) to produce a desired output on an input/output waveguide.

Preferably, the reflector device 180 is a tilting micromirror array (as shown in FIGS. 1A-B) that is capable of reflecting selected spectral components of the spectrally resolved image generated by the lens 175, to provide wavelength-selective switching of, for example, a WDM signal input through an input/output waveguide onto any of the PLCs 110, 120, 130, 140. It can be appreciated by those skilled in the art that a liquid-crystal modulator or the like can also be used as the reflector device 180, and that the optical switching apparatus can provide wavelength blocker/equalizer functionality by controlling the reflection of the selected spectral components of the spectrally resolved image to control the power of such spectral components which is coupled into a desired waveguide array.

Figure 2:
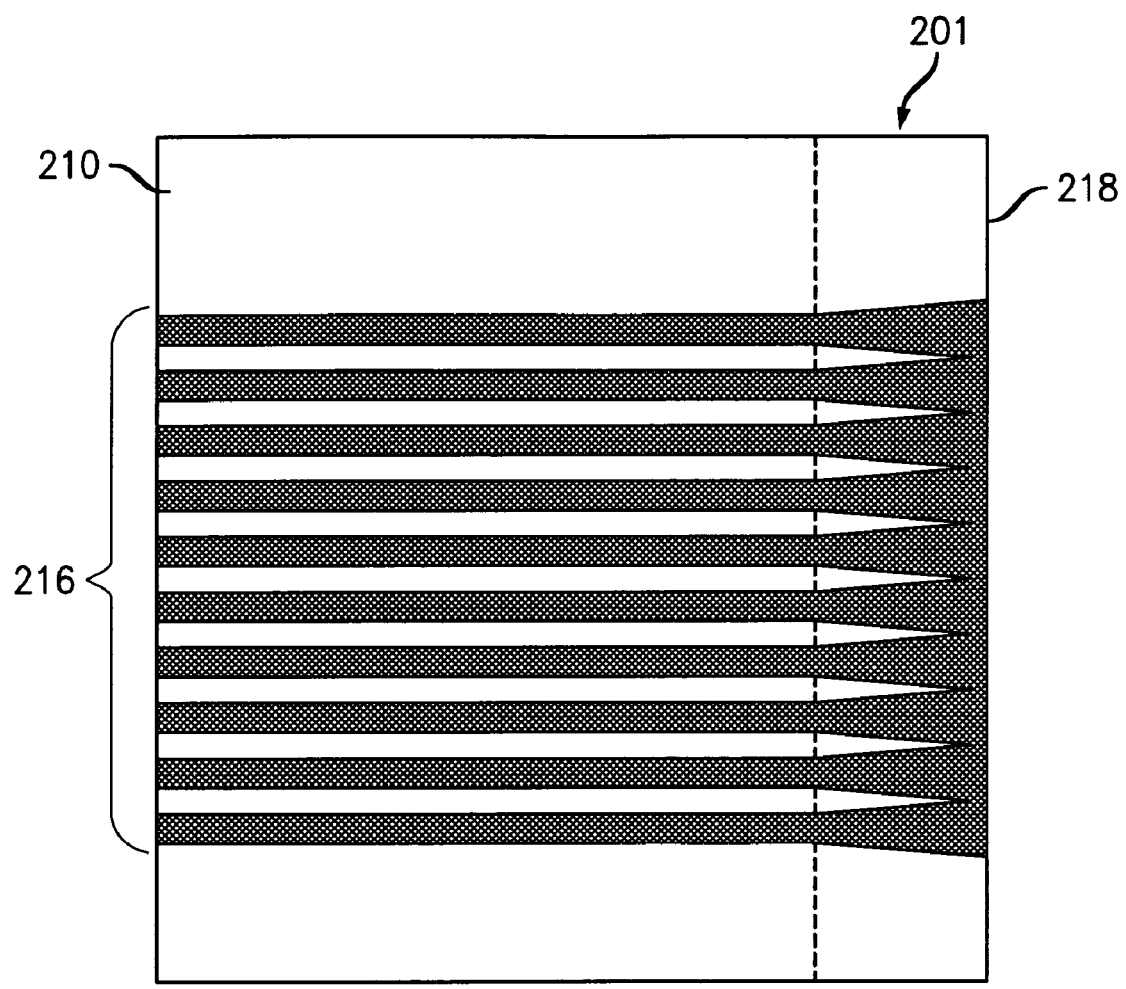
FIG. 2 is an illustration showing a waveguide array having a mode conversion region adjacent an edge facet of a PLC in accordance with embodiments of the invention.

In an alternative embodiment of an optical switch according to the invention (shown in FIG. 2), each of the waveguides on a PLC 210 include a mode conversion region (i.e. collectively referenced as mode conversion region 201), preferably positioned adjacent to an edge facets 218 of the PLC 210, where each of the waveguides 216 broadens adiabatically. The mode conversion region causes light beams propagated through the waveguides to emerge from the waveguides in an elliptic mode such that the numerical aperture (NA) in a vertical direction is high relative to the NA in a horizontal direction (i.e. a light beam emitted from a waveguide rapidly diverges in the vertical direction and slowly diverges in the horizontal direction, relatively). Such mode conversion eases registration/alignment requirements between waveguides of PLCs in a PLC stack, and prevents excitation of higher order diffraction orders.

In another alternative embodiment of an optical switch 300 according to the invention (shown in FIGS. 3A-B), a cylindrical lens array 371 is positioned adjacent to the PLCs 310, 320, 330, 340 to cause light beams emitted from a waveguide array (e.g. waveguide array 316) on a PLC (e.g. PLC 310) to be collimated in a vertical direction (e.g. as a phased array 350). The collimated phased array is then imaged by the lens 375 onto a reflector device 380. Preferably, the reflector device 180 is a tilting micromirror array (as shown in FIGS. 3A-B) having micromirrors that can be tilted or rotated about an axis such that selected components of a phased array (e.g. phased array 352) can be reflected and directed (e.g. as phased array 354) by the micromirror array through the lens 375 and the cylindrical lens array 371. (It can be understood by those skilled in the art that any device, including the micromirror array discussed above, capable of reflecting and directing selected components of the phased array can be used as the reflector device 380.)

The lens 375 and the cylindrical lens array 371 cooperatively image the reflected phased array 354 in the vertical and horizontal directions, respectively onto an edge facet of a PLC (e.g. PLC 330) coupling the phased array into a waveguide array to generate a desired output. It can be appreciated by those skilled in the art that the optical switching apparatus 300 can provide optical switching functionality as well as wavelength blocker/equalizer functionality, as discussed above with reference to the embodiments illustrated in FIGS. 1A-B.

Figure 4:
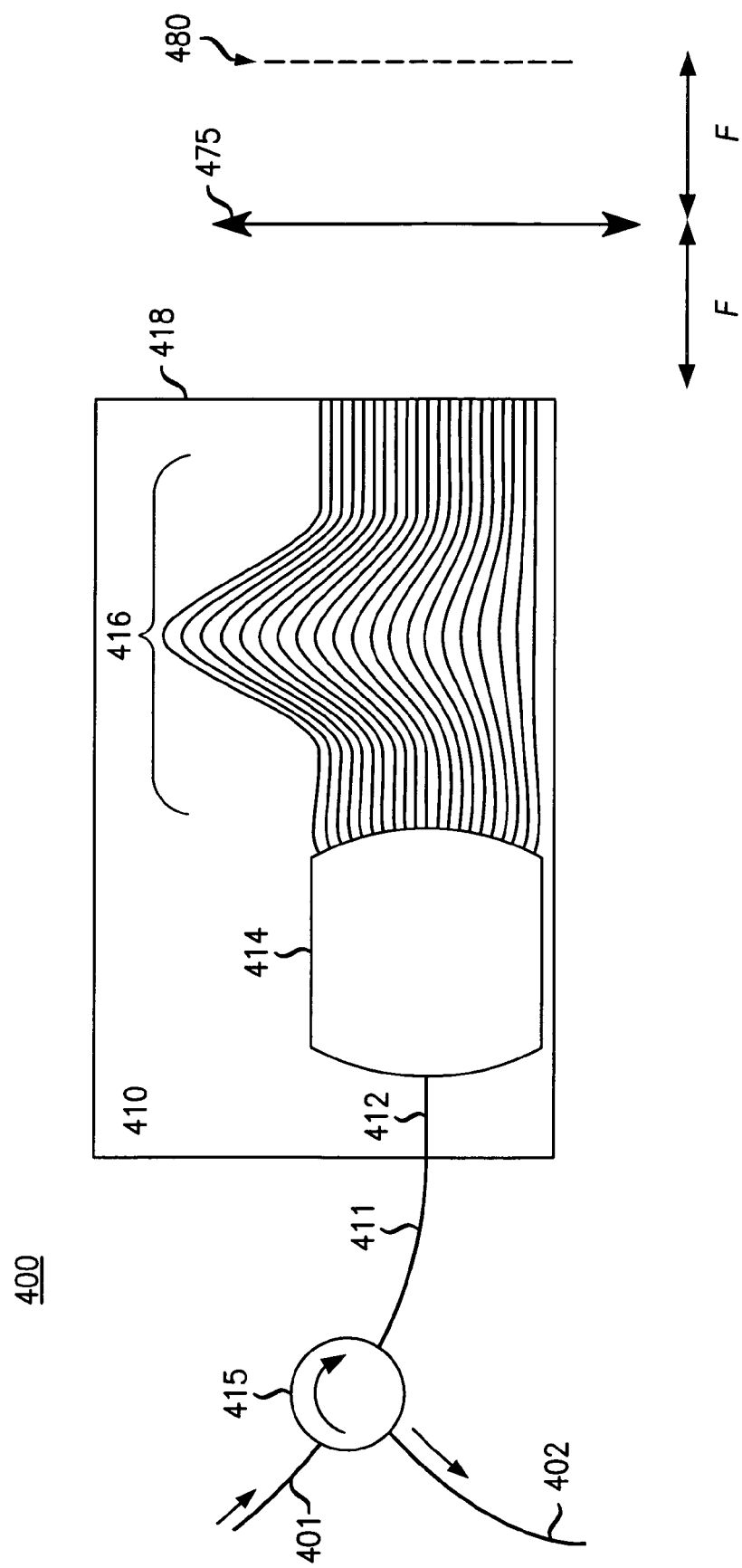
FIG. 4 is a top view of a dynamic spectral equalizer apparatus according to another embodiment of the invention.

In another embodiment of the invention, a dynamic spectral equalizer apparatus 400, shown in FIG. 4, is provided. In a preferred embodiment, the dynamic spectral equalizer 400 comprises a PLC 410, a lens 475 adjacent to the PLC 410, and a reflector device 480 adjacent to the lens 475. The PLC 410 preferably includes an input/output waveguide 412, and a waveguide array 416 coupled to the input/output waveguide 412. The waveguides of the waveguide array 416 preferably terminate at an edge facet 418 of the PLC 410. The waveguide array 416 may be coupled to the input/output waveguide 412 using, for example a star coupler 414. The edge facet 418 of the PLC 410 and the reflector device 480 are respectively positioned at a front and a back focal plane of the lens 475 (i.e. at a focal distance F), such that light propagated in through the input/output waveguide 412 generates a phased array output at the edge facet 418 of the PLC 410. The phased array output is spatially Fourier transformed by the lens 475 to generate a spectrally resolved image on the reflector device 480 at the back focal plane of the lens 475. The reflector device 480 controls the reflection of selected spectral components of the spectrally resolved image back through the lens 475 and into the waveguide array 416, to generate a desired equalized output on the input/output waveguide 412. A separator means 415, such as a circulator, may be coupled to the input/output waveguide 412 for separating input light (e.g. propagated on an input fiber 401) from the desired equalized output (which can be output on an output fiber 402). The reflector device 480 can be a liquid crystal modulator, a tilting micromirror array, or the like.

In a preferred embodiment of a method according to the invention optical switching is achieved by receiving a light beam, such as a WDM signal, into a waveguide of a PLC. The light beam is then coupled into a waveguide array which terminates at an edge facet of the PLC to generate a phased array output at the edge facet of the PLC. The phased array output is spatially Fourier transformed using one or more lenses to generate a spectrally resolved image. At least one spectral component of the spectrally resolved image is reflected through one or more lenses using a reflector device, to couple the reflected spectral components into a desired waveguide array on a PLC to generate a desired output (e.g. having selected wavelengths and/or a desired power level).

Figure 5:
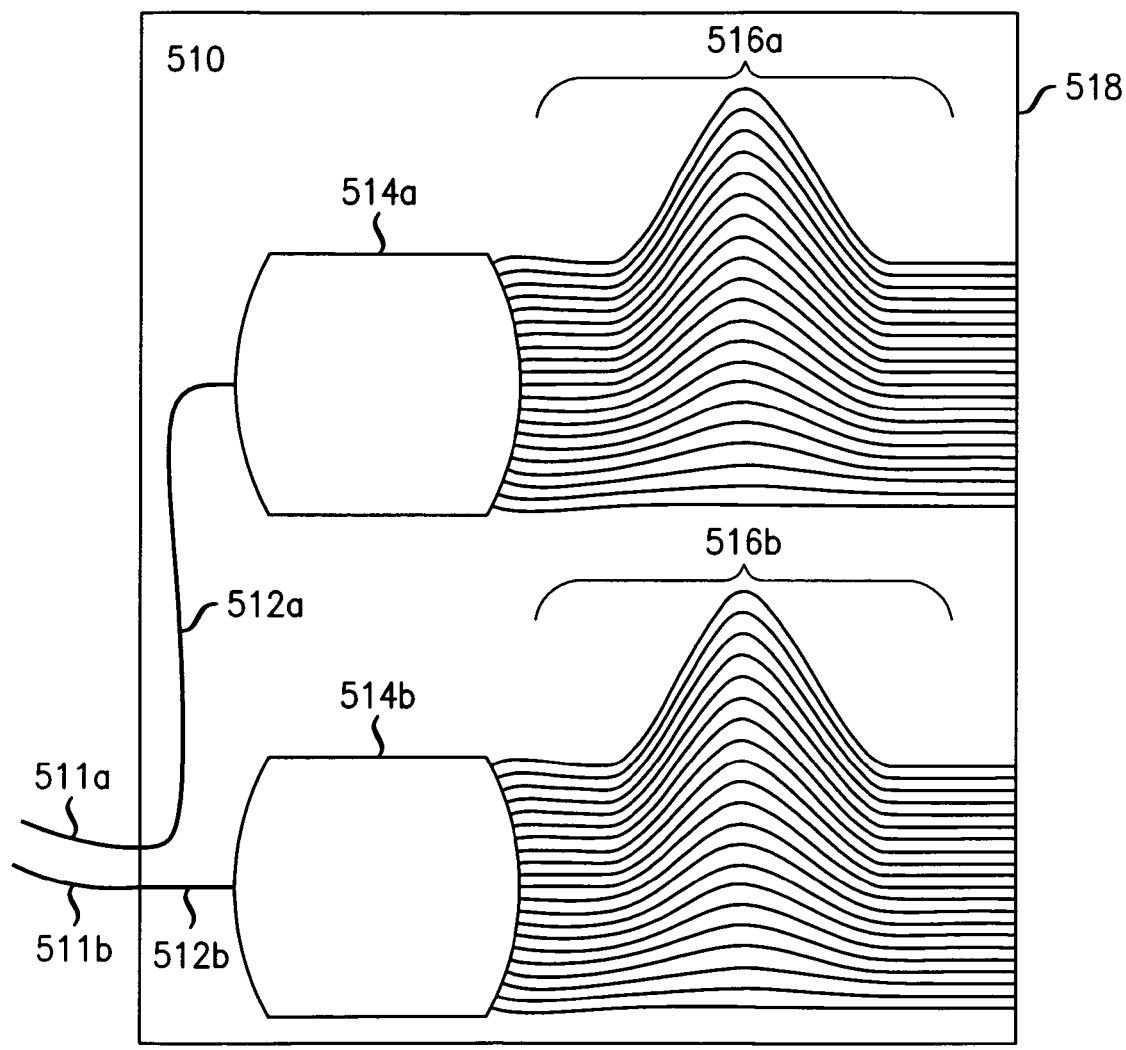
FIG. 5 is a top view of an optical switch according to another embodiment of the invention.

It will be appreciated by those skilled in the art that changes could be made to the embodiments described above without departing from the broad inventive concept thereof. For example, each PLC may comprise multiple input/output waveguides coupled to multiple waveguide arrays, as shown in FIG. 5, to significantly increase the port count of an optical switch without significantly increasing the complexity of the switch. Also, it will be appreciated that various combinations of lenses may be used to spatially Fourier transform a phased array output from the waveguide array(s) of a PLC. Additionally, a single linear array of micro electro-mechanical systems (MEMS) micromirrors may be used as the reflector device to reflect and direct one or more selected spectral components of the spectrally resolved image generated by the lens(es). Further, it is understood that additional elements may be added to one or more of the PLCs to allow the optical switching apparatus to perform more operations on light beams propagated through the apparatus. Some examples of such operations include, but are not limited to, implementing a multi-fiber single channel or banded channel multiplexer/demultiplexer, chromatic dispersion and/or polarization mode dispersion compensation, and other operations known in the field of planar lightwave circuits.

It is understood, therefore, that this invention is not limited to the particular embodiments disclosed, but it is intended to cover modifications within the spirit and scope of the present invention as defined by the appended claims.

We claim:

1. An optical switching apparatus comprising:
a planar lightwave circuit (PLC) including
a single bidirectional input/output waveguide,
a waveguide array coupled to the single input/output waveguide, said array having a plurality of waveguides terminated at an edge facet of the PLC,
at least one lens positioned adjacent to the PLC, and
a reflector device positioned adjacent to the at least one lens,
such that when a multi-wavelength input optical signal is coupled through the single bidirectional input/output waveguide in to the PLC,
the waveguide array generates a phased array optical signal at the edge facet of the PLC,
the at least one lens spatially Fourier transforms the phased array optical signal, thereby generating a spectrally resolved image of the input optical signal, and
the reflector device selectively reflects the spectrally resolved image through the at least one lens and selectively couples the image into the waveguide array of the PLC to generate a desired output optical signal at the single input/output waveguide, wherein the single input/output waveguide couple the desired output signal out from the PLC,
characterized in that:
the single bidirectional input/output waveguide is the only input as well as the only output waveguide for the PLC such that it carries the multi-wavelength input optical signal and the desired output optical signal to and from the PLC respectively.

2. The optical switching apparatus of claim 1, wherein at least one waveguide of the waveguide array includes a mode conversion region adjacent to the edge facet of the PLC.

3. The optical switching apparatus of claim 1, wherein the edge facet of the PLC and the reflector device are respectively positioned at a front focal plane and a back focal plane of the at least one lens.

4. The optical switching apparatus of claim 1, wherein the reflector device is a tilting micromirror array for reflecting selected spectral components of the spectrally resolved image to provide wavelength-selective switching of the multi-wavelength input optical signal.

5. The optical switching apparatus of claim 1, wherein the reflector device controls the reflection of the spectrally resolved image to generate a substantially spectrally equalized signal as the desired output optical signal at the single input/output waveguide.

6. The optical switching apparatus of claim 1, wherein the reflector device is a liquid crystal modulator array.

7. The optical switching apparatus of claim 1 further including a separator means coupled to the single bidirectional input/output waveguide, for separating the multi-wavelength input optical signal coupled into the single bidirectional input/output waveguide from the desired output optical signal generated at the single bidirectional input/output waveguide.

8. An optical switching apparatus comprising:
a plurality of planar lightwave circuits (PLCs) arranged in a stack, wherein each PLC in the stack includes;
a single bidirectional input/output waveguide;
a waveguide array coupled to the single bidirectional input/output waveguide, said waveguide array having a plurality of waveguides terminated at an edge facet of the PLC, wherein the waveguides of the plurality waveguide arrays of the PLCs are substantially aligned to facilitate switching of optical signals between the PLCs in the stack,
at least one lens positioned adjacent to the plurality of PLCs; and
a reflector device positioned adjacent to the at least one lens;
such that upon coupling at least one multi-wavelength input optical signal through a first single bidirectional input/output waveguide of a first PLC in the stack,
a first waveguide array coupled to the first bidirectional input/output waveguide generates a phased array optical signal at the edge facet of this first PLC;
the at least one lens spatially Fourier transforms the phased array optical signal, thereby generating one or more spectrally resolved images of the at least multi-wavelength input optical signal, and the reflector device selectively reflects the one or more spectrally resolved images through the at least one lens, and selectively couples the one or more spectrally resolved images in a reverse direction, into one or more of the waveguide arrays of the plurality of waveguide arrays, thereby generating one or more desired output optical signals at one or more of the single bidirectional input/output waveguides, wherein each of the single bidirectional input/output waveguides serve as the only input as well as the only output waveguides for their respective PLCs.

9. The optical switching apparatus of claim 8, further comprising one or more cylindrical lenses positioned adjacent to the edge facets of the PLCs for collimating in a vertical direction, the phased array optical signals generated by the one or more waveguide arrays, such that the reflector device selectively couples the one or more spectrally resolved images to the one or more waveguide arrays of the corresponding ones of one or more PLCs in the stack.

10. The optical switching apparatus of claim 8, wherein at least one waveguide of the waveguide arrays includes a mode conversion region adjacent to the edge facet of the corresponding PLC.

11. The optical switching apparatus of claim 8, wherein the edge facets of the plurality of PLCs and the reflector device are respectively positioned at a front focal plane and a back focal plane of the at least one lens.

12. The optical switching apparatus of claim 8, wherein the reflector device is a tilting micromirror array for reflecting selected spectral components of the one or more spectrally resolved images such that at least one spectral component is selectively coupled to the one or more waveguide arrays of the plurality of the PLCs, thereby generating the one or more desired output optical signals at the one or more single input/output waveguides coupled to the respective ones of the one or more waveguide arrays.

13. The optical switching apparatus of claim 8, wherein the reflector device controls the reflection of the one or more spectrally resolved images to generate a substantially spectrally equalized signal as the one or more desired output optical signals at the one or more single input/output waveguide.

14. The optical switching apparatus of claim 8, wherein the reflector device is a liquid crystal modulator array.

15. The optical switching apparatus of claim 8 further including a plurality of separator means for separating the one or more input optical signals from the one or more desired output optical signals, wherein each separator means is respectively coupled to one each of the plurality of the single input/output waveguides.

16. The optical switching apparatus of claim 8, wherein at least one PLC of the plurality of PLCs further comprises:

a plurality of bidirectional input/output waveguides; and a plurality of waveguide arrays, each one of the waveguide arrays coupled to a corresponding ones of the plurality of bidirectional input/output waveguides, wherein waveguides of the waveguide arrays terminate at an edge facet of the at least one PLC, and wherein the waveguides of the waveguide arrays are substantially aligned to facilitate switching between the waveguide arrays of the at least one PLC, characterized in that;

the plurality of bidirectional input/output waveguides serve as the only input and the only output waveguides for carrying the input signals and the output signals to and from the at least one PLC, respectively.

17. A method for optical switching comprising:

receiving at least one multi-wavelength input optical signal in to a single input/output waveguide of a PLC;

coupling the input optical signal from the input/output waveguide into a waveguide array, said waveguide array having a plurality of waveguides which terminate at an edge facet of the PLC to generate a phased array output at the edge facet of the PLC;

spatially Fourier transforming the phased array output using one or more lenses to generate a spectrally resolved image;

reflecting selectively, one or more spectral components of the spectrally resolved image through one or more lenses using a reflector device;

coupling back, the one or more reflected spectral components into the waveguide array on the PLC to generate a desired output optical signal at the single input/output waveguide for carrying out from the PLC; and separating the multi-wavelength input optical signal received at the single input/output waveguide from the desired output optical signal by a separator means;

characterized in that:

said step of receiving the multi-wavelength input optical signal in to the PLC, and said step of carrying the desired output optical signal from the PLC, is performed by the single input/output waveguide that is bidirectional, such that the single input/output is the input waveguide as well as the output waveguide.

* * * * *